United States Patent [19]

Ginkel

[11] Patent Number: 4,858,036
[45] Date of Patent: Aug. 15, 1989

[54] SOFTWARE PROTECTION AND IDENTIFICATION SYSTEM

[76] Inventor: Peter Ginkel, 1275 Northcliff Trace, Roswell, Ga. 30076

[21] Appl. No.: 388,036

[22] Filed: Aug. 4, 1986

[51] Int. Cl.⁴ .............................. G11B 5/02; G11B 5/09
[52] U.S. Cl. ...................................... 360/60; 360/131; 360/135; 360/137; 364/300
[58] Field of Search ...................... 360/131, 60, 77, 53, 360/15, 137, 135

[56] References Cited

U.S. PATENT DOCUMENTS

| | | |
|---|---|---|
| 2,881,073 | 4/1959 | Maclay . |
| 3,219,353 | 11/1965 | Pentky ............................. 360/135 |
| 3,245,062 | 4/1966 | Kornei . |
| 3,564,156 | 2/1971 | Greiner et al. . |
| 3,883,892 | 5/1975 | Kneller et al. . |
| 3,956,769 | 5/1979 | Beecroft et al. ...................... 360/77 |
| 4,239,959 | 12/1980 | Gutterman . |
| 4,313,140 | 1/1982 | Keidl . |
| 4,584,641 | 4/1986 | Guglielmino . |

FOREIGN PATENT DOCUMENTS

| | | |
|---|---|---|
| 54-58012 | 5/1979 | Japan . |
| 54-14668 | 11/1979 | Japan . |
| 2131580A | 6/1984 | United Kingdom . |
| 2137533B | 7/1986 | United Kingdom . |

OTHER PUBLICATIONS

R. Iseminger et al.; Hybrid Storage Disks IBM-TDB, vol. 23, No. 2, 7/80.
Isao Nakada: Magnetic Tape Device with Protecting Mechanism, Published Patent Appl. No. 521234, 62, 5/79.
Akira Iwamoto: Writing Protective Method, Published Application No. 5354319, 11/79.

Primary Examiner—Raymond F. Cardillo
Assistant Examiner—Alyssa H. Bowler
Attorney, Agent, or Firm—Jones & Askew

[57] ABSTRACT

A method of protecting machine readable signals recorded on magnetic recording media from unauthorized duplication and use. The signals to be protected are recorded on a first portion of the magnetic recording media. The protected signals on the first portion can be detected and altered by the machine. Second signals are recorded on a second portion of the magnetic recording media. The second signals on the second portion can be detected by the machine but cannot be altered by the machine. An attempt is made by the machine to alter the second signals on the second portion. Then, if the second signals cannot be detected on said second portion, the machine is disabled from further using the signals recorded on the recording media. Apparatus for practicing the method is also disclosed.

59 Claims, 2 Drawing Sheets

SOFTWARE PROTECTION AND IDENTIFICATION SYSTEM

FIELD OF THE INVENTION

The present invention relates to a system for protecting machine readable signals recorded on magnetic recording media from unauthorized duplication and use while still permitting duplication for back-up purposes.

BACKGROUND OF THE INVENTION

The protection of information recorded on magnetic recording media from unauthorized duplication and use has been a recent subject of considerable interest. This interest has assumed even greater proportions with the proliferation of "personal computers." The success of the "personal computer" is due in large part to the wide assortment of software systems which are available for use therewith. A variety of games, accounting programs, sophisticated scientific programs, graphics programs, data management programs and the like are presently available for purchase by the "personal computer" user. Although such software is usually protected under the copyright laws of the United States, the temptation to duplicate a copy of the software for a friend, or to rent a copy for unauthorized duplication, is often too great to resist. Accordingly, the unlawful duplication and use of copyrighted software has become a major problem.

There are known various methods for the prevention of duplication of magnetically recorded signals, software and/or data bases. One such method involves altering the format of the software stored on a disk or tape in such a manner as to confuse standard computer operating system based copying routines, thereby rendering the stored software uncopyable. This method of protection, however, can be easily defeated through the use of format independent copying routines.

Other methods of protection involve the attachment of specialized electronic devices to the computer system's hardware. Such devices, however, unnecessarily limit the use of the computer hardware and requires user cooperation to be effective. The employment of an additional piece of hardware also makes such methods expensive.

Accordingly, the protection systems which have been known heretofore have not been completely satisfactory.

SUMMARY OF THE INVENTION

The present invention relates to a method and apparatus for protecting machine readable signals recorded on magnetic recording media from unauthorized duplication and use. The signals to be protected are recorded on a first portion of the magnetic recording media. The protected signals on the first portion can be detected and altered by the machine. Second signals are recorded on a second portion of the magnetic recording media. The second signals on the second portion can be detected by the machine but cannot be altered by the machine. Program instructions recorded on the media command the machine to attempt to alter the second signals on the second portion. Then, if the second signals are altered on said second portion, the machine is disabled from further utilization of the signals recorded on the recording media.

Accordingly, it is an object of the present invention to provide an improved system for protecting machine readable signals recorded on magnetic recording media from unauthorized duplication and use.

Another object of the present invention is to provide a user transparent system for the prevention of unauthorized duplication and use of magnetically recorded computer software, data bases and the like.

A further object of the present invention is to provide a system for the prevention of unauthorized duplication and use of magnetically recorded signals while permitting the copying of the recorded signals for back-up purposes.

Another object of the present invention is to provide for indelible identification of magnetic recording media, for example, by permanently encoding a magnetic serial number thereon.

These and other objects, features and advantages of the present invention will become apparent after a review of the following detailed description of the preferred embodiment and the appended drawing and claims.

DETAILED DESCRIPTION OF THE DISCLOSED EMBODIMENT

Figure 1:
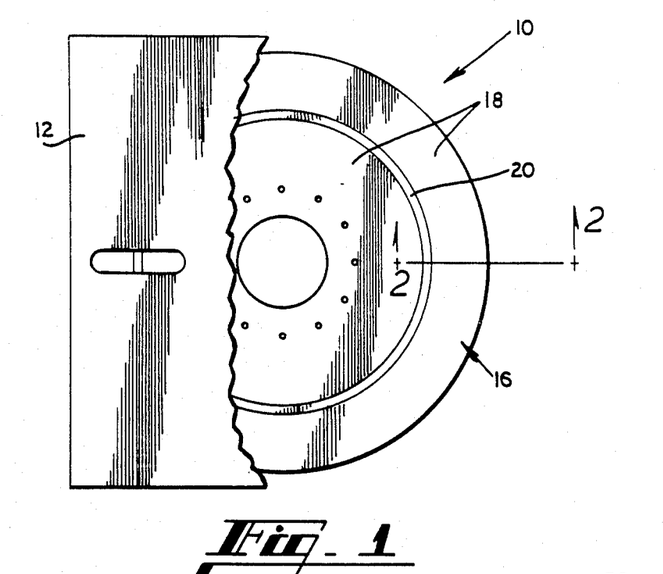
FIG. 1 is a front view of a disclosed embodiment of a magnetic information storage disk made in accordance with the protection system of the present invention shown with the disk jacket partially broken away for clarity.

Referring now to the drawing in which like numbers indicate like elements throughout the several views, it will be seen that there is a magnetic information storage disk, more commonly referred to as a "floppy disk" 10. Although the magnetic storage media of the present invention is illustrated as being a disk, it is specifically contemplated that the protective system of the present invention is also useful with other types of magnetic storage media, such as tapes, drums, hard disks, cards and the like.

The floppy disk 10 is contained in a jacket 12 which protects the disk when not in use, as is conventional in the art. The disk 10 comprises a non-magnetic substrate 14, such as a plastic material, for example, polyethylene terephalate, which supports on its surface a thin layer or coating 16 of a magnetic material, usually contained in a nonmagnetic binder, such as polyurethane. The magnetic coating 16 is divided into two portions. The first portion 18 includes a layer of a conventional magnetic material, such as iron oxide ($Fe_2O_3$) or chromium oxides. Such materials have relatively high magnetic permeability and low magnetic coercivity and can be referred to as magnetically "soft." That is, signals can be encoded thereon or erased therefrom by the application of relatively weak magnetic fields (usually less than 1000 oersteds. The second portion 20 includes a layer of magnetic material having a relatively high magnetic coercivity and can be referred to as magnetically "hard." That is, signals can be encoded thereon or erased therefrom only by the application of relatively strong magnetic fields (usually greater than 1000 oersteds). Magnetic materials possessing relatively high permeability and high coercivity include, for example, Alnico (V), iron/platinum alloys, magnetic ceramics and the like. Other factors affecting magnetic coercivity include the size and shape of the particles of the magnetic material. Additional resistance to erasure or overwriting by the application of relatively low strength magnetic fields can be provided by interposing a non-magnetic protection overlayer, such as a plastic film, between the magnetic material and the magnetic field source. While a protective coating may decrease the flux density at the signal detector, magnetically "hard" materials having higher magnetization levels (remanence or retentivity) can be employed in order to compensate for the reduction in signal strength and provide acceptable signal-to-noise levels at the signal detector. In certain applications, such as high density information storage, an overlayer may be disadvantageous.

Other methods of increasing the coercivity of the signal by the magnetic material include magnetic annealing, etching and the like. See U.S. Pat. Nos. 2,881,073; 3,245,062; 3,564,156; 3,883,892; 4,239,959 and 4,313,140 (all incorporated herein by reference). Such methods are also useful with the present invention.

The disk 10 is designed to be used in conjunction with a device: (1) for detecting the signals recorded thereon and (2) for altering the signals recorded thereon either by erasing the signals, by placing signals thereon where none existed or by overwriting the signals, i.e., changing signals on the disk to different signals. The foregoing operations are performed by applying a magnetic field of a predetermined strength to the magnetic material, in a manner well known in the art, by a conventional read/write head 22 (FIG. 2) as is typically found in a disk drive unit (not shown).

Figure 2:
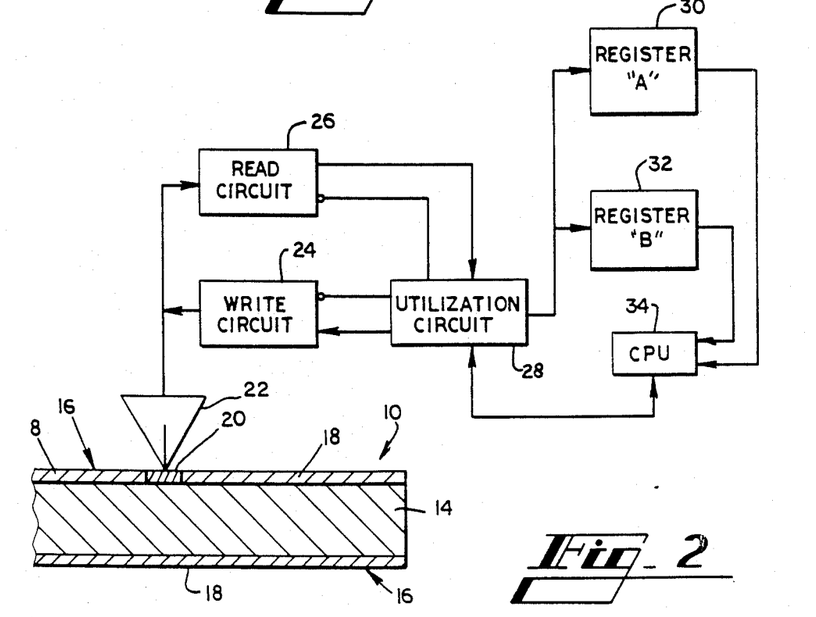
FIG. 2 is a schematic view of a disclosed embodiment of a typical computer system, including a magnetic read/write head and a magnetic information storage disk, useful with the protection system of the present invention.

A disk drive, in addition to containing the read/write head 22, also contains motors for rotating the disk 10 at a relatively high speed, e.g. 360 RPM, and for radially moving the read/write head with respect to the rotating disk so that signals from various "tracks" on the disk can be detected and altered as desired.

The magnetic field produced by the read/write head 22 at the surface of disk 10 is of a known strength for any given disk drive. Also, for commercially available floppy disk drives, the magnetic field strength produced at the disk surface during write operations will be within a known range of values, for example, usually substantially less than 1000 oersteds. The selection of the particular method or materials used in constructing the first portion 18 and the second portion 20 of the magnetic coating 16 is therefore critical in the following respect. The magnetic coating 16 in the first portion 18 must have a retentivity and coercivity such that signals recorded on the coating can be detected by the read/write head 22, and, optionally, altered by the read/write head; the magnetic coating in the second portion 20 must have a characteristic retentivity so that signals recorded on the coating can be detected by the read/write head, and a coercivity such that the signals cannot be substantially altered by the read/write had. Stated another way, the second portion 20 of the disk 10 is a read only portion. Accordingly, the coercivity of the magnetic coating will depend on the strength of the read/write head of the particular disk drive. However, it is useful in the present invention that the ratio of magnetic coercivity of the second portion 20 and the first portion 18 be greater than 2 to 1. It is within the skill of the art to select the method and material from which the magnetic coating 16 is constructed to obtain the foregoing properties.

With particular reference to FIG. 2, the read/write head 22 is used in conjunction with a conventional computer hardware system including a write circuit 24, a read circuit 26, a utilization circuit 28, a register "A" 30, a register "B" 32 and a central processing unit (CPU) 34. Each of the foregoing items 22–34 are well known in the art.

The CPU 34, the utilization circuit 28 and the read circuit 26 permit the read/write head 22 to read data from the disk 10 by detecting signals recorded thereon. The CPU 34, the utilization circuit 28 and the write circuit 24 cause the read/write head 22 to alter the signals recorded on the disk 10 by applying a magnetic field of a predetermined strength thereto. Signals recorded on the disk 10 which are read by the read/write head 22 can be stored in any of a plurality of random access memory locations within the computer system, such as in registers "A" and "B" 30, 32. Information in the registers "A" and "B" can be accessed by the CPU 34 and processed as desired in the conventional manner.

In order to protect computer software against unauthorized duplication and use, a software manufacturer places the computer program on the disk 10 as a series of signals in the following manner. It should be understood that the present invention is not limited to computer software but includes any other type of signal recorded on the magnetic media for which protection from unauthorized duplication and use is desired.

A computer program for which protection is desired is recorded and stored on the first portion 18 of the disk 10 in the conventional manner. In addition, a desired signal is recorded on the second portion 20 of the disk 10 using techniques in accordance with the present invention to render the desired signal permanent, or read only, with respect to the read/write head 22. This desired signal can take virtually any form, such as a serial number, a sophisticated coding key or the like. For purposes of an example, assume that the number "1" is recorded on the second portion 20 of the disk 10.

Figure 3:
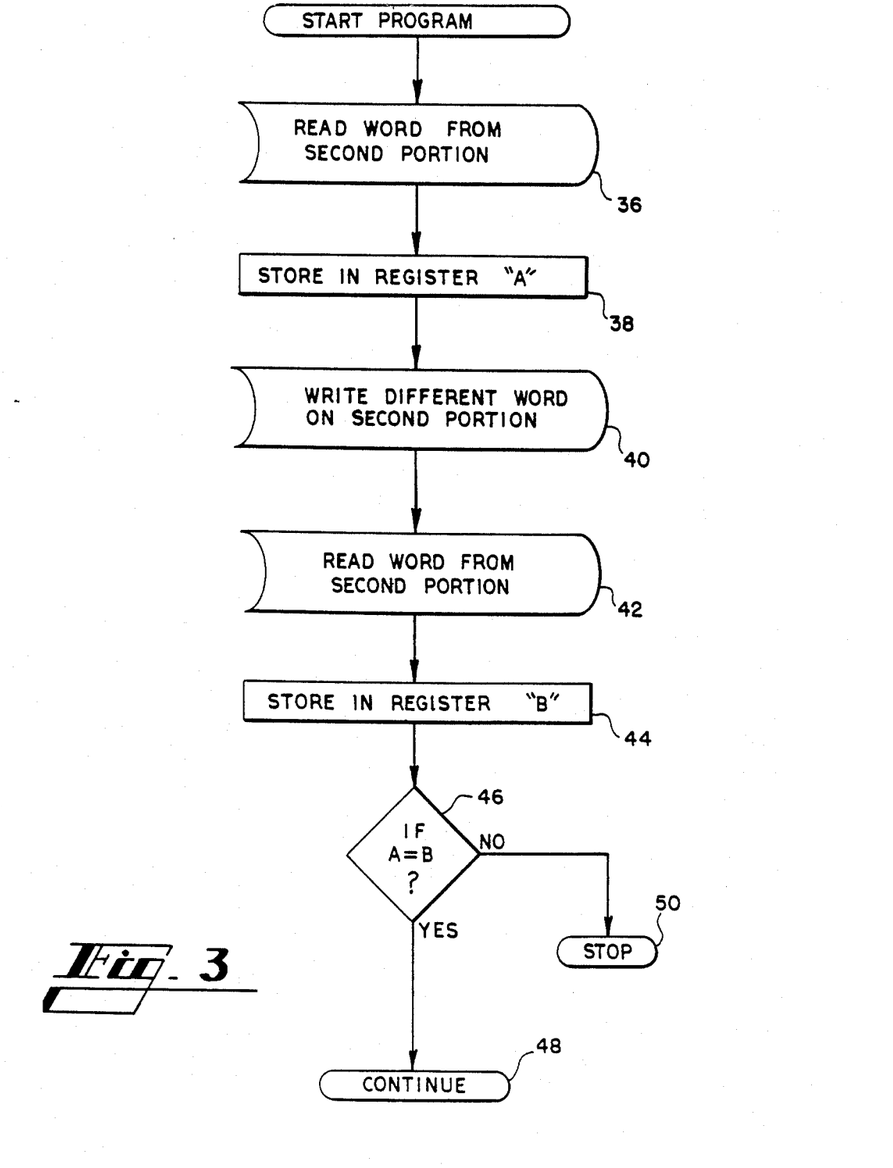
FIG. 3 is a view of a flow chart of a disclosed embodiment of the protection system of the present invention.

The disk 10 is formatted in such a manner that the following instructions are read into the computer after the disk 10 is inserted into the disk drive and reading of the disk by the read/write head 22 is begun. The read/write head 22 is instructed to read the number recorded on the second portion 20 of the disk 10, such as at 36, and store that number in register "A" 30, such as at 38. The read/write head 22 is then instructed to alter the number recorded on the second portion 20 of the disk 10, such as at 40, by either erasing the number or writing a different number in its place, such as the number "0". Since the magnetic field produced by the read/write head 22 is insufficient to alter the number "1" recorded on the second portion 20, the number "1" remains recorded on the second porton and is not replaced by the number "0."

The read/write head 22 is then instructed to again read the number recorded on the second portion 20 of the disk 10, such as at 42, but this time to store that number in register "B" 32, such as at 44. The CPU 34 is then instructed to compare the number stored in register "A" 30 with the number stored in register "B" 32, such as at 46. If the number stored in register "A" 30 is identical to the number stored in register "B" 32, the read/write head 22 is instructed to continue, such as at 48, typically by reading into the computer random access memory the computer program for which protection is desired. If the number stored in register "A" 30 is different from the number stored in register "B", any further use of the protected program by the computer is disabled by, for example stopping the CPU 34, such as at 50, stopping the read/write head 22, instructing the read/write head to erase or otherwise alter the protected program recorded on the first part of the disk 10, to not load the protected program into the computer's random access memory, to dump all information stored in the computer's random access memory, or the like.

It will be appreciated that when the disk 10 is read in the foregoing manner, the number in the second portion 20 of the disk is unaltered, the number in registers "A" and "B" are identical and the program is permitted to continue. The information on both the first portion 18 and the second portion 20 can then be copied onto a conventional floppy disk (not shown), i.e. a disk which can be altered by the read/write head 22, if desired. The protected program copied onto the conventional disk by conventional methods, however; cannot be used, unless copied back onto the disk 10, for the reasons described below.

When the conventional disk is loaded into the disk drive, the same instructions and steps are followed as with the disk 10. The difference, however, is that when the read/write head 22 is instructed to alter the number which is in the space on the conventional disk which corresponds to the second portion 20, the read/write head is successful in altering that information. Therefore, the number stored in register "A" 20 is "1" and the number stored in register "B" 32 is "0". When the two registers 30, 32 are compared, the numbers are not identical and the computer is disabled, or stopped, from further processing.

It is specifically contemplated that other procedures using the foregoing principles can also be successfully employed. For example, the first reading step can be eliminated so that the program merely attempts to erase a known signal in the second portion and then checks to see if the known signal is still present. Conversely, no signal can be recorded in the second porton 20. The program can attempt to write a signal in the second portion 20 and, then, check to see if it is successful.

The significant step is attempting to alter the signal (or lack of signal) recorded on the second portion 20 of the disk 10 using a read/write head 22 which is incapable of altering signals recorded on the second portion, but which can alter signals on conventional disks. Then, checking the second portion to determine if any alteration was actually made in the signal recorded on the second portion, or the portion of a conventional disk corresponding to the second portion. If the signals on the second portion are unaltered, the disk is an authorized copy. If the signals on the second portion are altered, the disk is an unauthorized duplicate and further use of the information recorded on the disk is prevented.

It should be understood, of course, that the foregoing relates only to preferred embodiments of the present invention and that numerous modifications or alterations may be made therein without departing from the spirit and scope of the invention as set forth in the appended claims.

What is claimed is:

1. A copy protectable magnetic data recording medium for use with a machine capable of reading data recorded on said medium, of altering data recorded on said medium by erasing said data and/or by writing other data in its place and of executing instructions recorded on said medium, said medium comprising:
   a substrate;
   magnetic material supported on said substrate, said magnetic material having a first region which is both readable and alterable by said machine and a separate second region which is only readable by said machine;
   a first sequence of instructions or data for said machine recorded on said medium in said first region for providing a predetermined function; and
   a second sequence of instructions or data for said machine recorded on said medium for instructing said machine to erase or alter predetermined information or data originally provided on said second region, for thereafter instructing said machine to read said second region, and for thereafter instructing said machine to execute said first sequence of instructions if said machine correctly reads said originally provided information or data in said second region,
   whereby said machine is prevented from executing said first sequence of instructions if said machine does not correctly read said originally provided information or data in said second region.

2. The magnetic data recording medium of claim 1, wherein said medium comprises:
   a non-magnetic substrate;
   a first region of magnetizable material supported on a first portion of said substrate, said first region having a first magnetic coercivity within a predetermined range; and
   a second region of magnetizable material supported on a second portion of said substrate spatially adjacent said first region, said second region having a second magnetic coercivity within a predetermined range which is different from said first magnetic coercivity.

3. The magnetic recording media of claim 2 wherein the ratio of the second magnetic coercivity to the first magnetic coercivity is greater than 2 to 1.

4. The magnetic recording medium of claim 2 wherein said second magnetic coercivity is of an amount such that said machine cannot erase or write signals on said second region.

5. The magnetic data recording medium of claim 2, wherein said medium is a disk, and wherein said second region of magnetizable material is radially adjacent said first region.

6. The magnetic data recording medium of claim 2, wherein said medium is a magnetic tape, and wherein said second region of magnetizable material is longitudinally adjacent said first region.

7. A data protection system comprising:
   a magnetic signal recording medium, said medium comprising a first region for recording signals and a spatially separate second region, signals recorded on said first region being alterable by a magnetic field of a first intensity,
   said second region being unresponsive to a magnetic field of said first intensity;
   means for detecting signals recorded on said medium in response to instructions in a computer system;
   means for applying a magnetic field not greater than said first intensity to said second region of said recording medium in response to instructions in said computer system to alter signals recorded on said second region; and means for disabling said computer system in response to detection by said detecting means of altered signals recorded in said second region.

8. The data protection system of claim 7, wherein said second region comprises a region on said recording medium which contains no magnetic recording material.

9. A computer system comprising:
a magnetic information storage disk, said disk having a first region on which information can be read and written and a second region from which information can only be read;
means for reading information stored on said disk;
means for writing information on said disk;
means for attempting to write predetermined digital signals on said second region;
means for comparing said predetermined digital signals to information read by said reading means from said second region; and
means responsive to said comparing means for disabling said computer system if information read from said second region equals said predetermined digital signals.

10. The computer system of claim 9 wherein said first region of said disk comprises a magnetic material having a first magnetic coercivity within a predetermined range such that information stored on said first region can be erased or overwritten by said writing means and wherein said second region of said disk comprises a magnetic material having a second magnetic coercivity within a predetermined range such that information stored on said second region cannot be altered by said writing means,
which second magnetic coercivity is different from said first magnetic coercivity.

11. The computer system of claim 9, wherein said disabling means is operative to disable said computer system if information read from said second region differs from information prestored in said second region.

12. The computer system of claim 9, wherein said second region of said disk comprises an area on said disk which contains no magnetizable material.

13. A method of protecting against the unauthorized duplication and use of computer software stored as data signals on an authorized magnetic storage medium, which signals are readable by a read/write means and are alterable by said read/write means, comprising the steps of:
recording said data signals on a first region of said authorized storage medium which can be read and altered by said read/write means;
providing validating signals on a second region of said authorized storage medium which can be read but cannot be altered by said read/write means;
attempting with said read/write means to alter said validating signals on a particular portion of a magnetic storage medium presented for use in a computer, said particular portion corresponding to said second region of said authorized storage medium;
reading said particular portion of said presented storage medium; and
preventing said data signals from being used by said computer if said validating signals are not read by said read/write means.

14. The method of claim 13 wherein said first region of said storage medium comprises a magnetic material having a first magnetic coercivity and wherein said second region comprises a magnetic material having a second magnetic coercivity which is different from said first magnetic coercivity.

15. The method of claim 14 wherein said magnetic storage medium is a magnetic storage disk and wherein said first region is adjacent said second region in the plane of the disk.

16. The method of claim 13, wherein said validating signals comprise signals read by said read/write means from said second region of said storage medium, and
wherein said second region comprises an area of said storage medium from which magnetizable material has been removed.

17. In a computer program protection method intended to distinguish between computer programs recorded on a bona fide recording medium and corresponding programs copied from such bona fide medium onto a similar recording medium, the steps of:
a. Writing a code signal at a predetermined location in said information recording medium in accordance with an instruction incorporated within the program to be protected;
b. Verifying in the computer the code signal stored at said predetermined location; and
c. The step of utilizing as said bona fide recording medium, a medium which is unresponsive to such instruction to write said code signal at said predetermined location.

18. The protection method of claim 17 wherein there is additionally included the step of disabling the computer upon the verification of the storing of said code signal at said predetermined location.

19. The protection method of claim 18 wherein said recording medium utilization step utilizes a bona fide recording medium constrained to reject program instructions at said predetermined location of a characteristic sufficient to carry out said instructions at said locations on a recording medium where said computer program is attempted to be similarly copied.

20. A method of protecting machine readable data signals recorded on an authorized magnetic recording medium from unauthorized duplication and use, comprising the steps of:
recording said data signals to be protected on a first region of said authorized magnetic recording medium, which signals can be detected and altered by a read/write means in a machine;
recording predetermined second signals on a second region of said authorized magnetic medium, which predetermined second signals can be read by said read/write means but cannot be altered by said read/write means;
attempting with said read/write means to alter said predetermined second signals on a particular portion of a magnetic recording medium presented for use in connection with said machine, said particular portion corresponding to said second region of said authorized recording medium;
reading said particular portion of said presented recording medium; and
disabling said machine to prevent use of said data signals when said predetermined second signals are not read on said particular portion by said read/write means.

21. A method of determining by a computer if a particular magnetic medium comprised of sections which are divided into subsections is an original or a copy, with an original having indicia on at least one subsection of at least one section thereon that are not modifiable by the medium write process, and a copy not having said indicia, or having indicia in a different pattern than said indicia, including a product program which is to be executed only if the medium is an original, and a medium test program for performing said method to test if said particular medium is an original, said method comprising the steps of:

writing at least portions of said sections of said particular medium with a test pattern which generates a change in the pattern of magnetic domains in said medium at predetermined locations within said portions, said portions including at least said indicia-containing subsections, with a subsection in said portions responding to said test pattern only in the absence of indicia thereon, to form a stored pattern in said portions;

storing an expected pattern, which is indicative of the pattern which is expected to read from said portions of an original medium including said indicia;

comparing said expected pattern with said stored pattern on at least a per subsection basis, to determine if predetermined subsections have the expected pattern of magnetic domains; and executing said product program only in response to the comparison determining that the corresponding subsections have the expected pattern of magnetic domains, which is indicative of the presence of said indicia, thereby indicating that said particular medium is an original.

22. The method claimed in claim 21, wherein said particular magnetic medium is a disk.

23. The method claimed in claim 22, wherein said disk is a floppy disk.

24. The method claimed in claim 22, wherein said disk is a hard disk.

25. The method claimed in claim 21, wherein said particular magnetic medium is a magnetic tape.

26. A method of determining by a computer if a particular magnetic disk having tracks formed thereon which are divided into sectors is an original or a copy, with an original having indicia on at least one sector of at least one track thereon that are not modifiable by the disk write process, and a copy not having said indicia, or having indicia in a different pattern than said indicia, including a product program which is to be executed only if the disk is an original, and a disk test program stored performing said method to test if said particular disk is an original, said method comprising the steps of:

writing at least portions of said tracks of said particular disk with a test pattern which generates a change in the pattern of magnetic domains in said disk at predetermined bit locations within said portions, said portions including at least said indicia-containing sectors, with a bit location in said sectors responding to said test pattern only in the absence of indicia thereon, to form a stored pattern in said portions;

storing an expected pattern, which is indicative of the pattern which is expected to be read from said portions of an original disk including said indicia;

comparing said expected pattern with said stored pattern on at least a per bit location basis, to determine if predetermined locations have the expected pattern of magnetic domains; and executing said product program only in response to the comparison determining that the predetermined locations have the expected pattern of magnetic domains, which is indicative of the presence of said indicia, thereby indicating that said particular disk is an original.

27. The method claimed in claim 26, wherein said disk is a floppy disk.

28. The method claimed in claim 26, wherein said disk is a hard disk.

29. A method of determining by a computer if a particular magnetic tape having records formed thereon which are divided into tracks is an original or a copy, with an original having indicia on at least one track for at least one record that are not modifiable by the tape write process, and a copy not having said indicia, or having indicia in a different pattern than said indicia, including a product program, which is to be executed only if the tape is an original, and a tape test program for performing said method to test if said particular tape is an original, said method comprising the steps of:

writing at least portions of said records of said particular tape with a test pattern which generates a change in the pattern of magnetic domains in said tape at predetermined bit locations within said portions, said portions including at least said indicia-containing tracks, with a bit location in said portions responding to said test pattern only in the absence of indicia thereon, to form a stored pattern in said portions;

storing an expected pattern, which is indicative of the pattern which is expected to be read from said portions of an original tape including said indicia;

comparing said expected pattern with said stored pattern on at least a per bit location basis, to determine if predetermined locations have the expected pattern of magnetic domains; and executing said product program only in response to the comparison determining that the predetermined locations have the expected pattern of magnetic domains, which is indicative of the presence of said indicia, thereby indicating that said particular tape is an original.

30. A method of determining by a computer if a particular magnetic disk having tracks formed thereon which are divided into sectors, with each sector being comprised of a plurality of bit storage locations, is an original or a copy, with an original disk having indicia on at least one bit storage location of at least one sector of at least one track that are not modifiable by the disk write process, with a copied disk not having said indicia, or having indicia in a different pattern than said indicia, including a product program, which is to be executed only if said disk is an original, and a disk test program for performing said method to test if said particular disk is an original, said method comprising the steps of:

storing a key pattern, which is a binary representation of the presence or absence of said indicia at predetermined locations of said at least one track of an original disk;

writing at least portions of said tracks of said particular disk with a test pattern which generates a change in the pattern of magnetic domains in said disk at predetermined bit locations within said portions, said portions including at least said indicia-containing bit storage locations, with a bit location in said portions responding to said test pattern only in the absence of indicia thereon, and reading out said portions to form a stored pattern, which is indicative of the presence or absence of said indicia at least at each bit storage location of said portions;

comparing said test pattern with said stored pattern on at least a per bit location basis to determine if predetermined locations have a pattern of indicia, to provide a first compare result; comparing said key pattern with said first compare result on at least a per location basis to provide a second compare result which is indicative of whether or not said indicia on said sectors of said particular disk correspond with said indicia on said sectors of an original medium; and executing said product program only in response to the second compare result indicating a predetermined location comparison of said key pattern and said first compare result, thereby indicating that said particular disk is an original.

31. The method claimed in 30, wherein said disk is a floppy disk.

32. The method claimed in 30, wherein said disk is a hard disk.

33. A software copy-protection apparatus, which is operable with a computer, comprising:

a particular magnetic medium having tracks formed thereon which are divided into sectors, with each sector being comprised of a plurality of bit storage locations, with an original medium having indicia on at least one bit storage location of at least one sector of at least one track that are not modifiable by the medium write process, with a copied medium not having said indicia, or having indicia in a different pattern than said indicia;

a product program which is to be executed only if said medium is an original;

means for writing at least portions of said tracks with a test pattern which generates a change in the pattern of magnetic domains in said medium at predetermined bit locations within said portions, said portions including at least said indicia-containing bit locations, with a given bit location in said portions responding to said pattern only in the absence of indicia thereon;

means for storing an expected pattern which is indicative of the pattern which is expected to be read from said portions of an original medium including indicia, in a first storage location;

means for reading out said portions and storing the read out data in a second storage location;

means for comparing the expected pattern stored in said first storage location with the data stored in said second storage location on at least a per bit corresponding storage location basis to determine if predetermined locations have the expected pattern of magnetic domains; and means responsive to the comparison for executing said product program only in response to the comparison determining that predetermined locations on the medium have the expected pattern of magnetic domains, which is indicative of the presence of said indicia, thereby indicating that said particular medium is an original.

34. The combination claimed in claim 33, wherein said magnetic medium is a disk.

35. The combination claimed in claim 34, wherein said disk is a floppy disk.

36. The combination claimed in claim 34, wherein said disk is a hard disk.

37. The software copy-protection apparatus, which is operable with a computer, comprising:

a particular magnetic medium having records formed thereon which are divided into tracks, with each track being comprised of a plurality of bit storage locations, with an original medium having indicia on at least one bit storage location of at least one track of at least one record that are not modifiable by the medium write process, with a copied medium not having said indicia, or having indicia in a different pattern than said indicia;

a product program stored on said medium which is to be executed only if said medium is an original;

means for writing at least portions of said records with a test pattern which generates a change in the pattern of magnetic domains in said medium at predetermined bit locations in said portions, said portions including at least said indicia-containing bit locations, with a given bit location in said portions responding to said test pattern only in the absence of indicia thereon;

means for storing an expected pattern, which is indicative of the pattern which is expected to be read from said portions of an original medium including said indicia, in a first storage location;

means for reading out said portions and storing the read out data in a second storage location;

means for comparing the expected pattern stored in said first storage location with the data stored in said second storage location on a (sic) least a per bit corresponding basis to determine if predetermined locations have the expected pattern of magnetic domains; and means responsive to the comparison for executing said product program only in response to the comparison determining that predetermined locations exhibit the expected pattern of magnetic domains, which is indicative of the presence of said indicia, thereby indicating that said particular medium is an original.

38. The combination claimed in claim 37, wherein said particular medium is a magnetic tape.

39. A software copy-protection apparatus, which is operable with a computer, comprising:

a particular magnetic medium having tracks formed thereon which are divided into sectors, with each sector being comprised of a plurality of bit storage locations, with an original medium having indicia on at least one bit storage location of at least one sector of at least one track that are not modifiable by the medium write process, with a copied medium not having said indicia, or having indicia in a different pattern than said indicia;

a product program which is to be executed only if said medium is an original;

means for storing a key pattern in a first storage location, which is a binary representation indicative of the presence or absence of said indicia at predetermined locations of said at least one track of an original medium;

means for writing at least portions of said tracks of said medium with a test pattern which generates a change in the pattern of magnetic domains in said medium at predetermined bit locations within said portions, said portions including at least said indicia-containing bit storage location, with a bit location in said portions responding to said test pattern only in the absence of indicia thereon;

means for storing said test pattern in a second storage location;

means for reading out said portions and storing the read out data in a third storage location;

means for comparing the test pattern stored in said second storage location with the data stored in said third storage location on at least a per bit corresponding storage location basis to provide a first compare result;

means for comparing said key pattern, stored in said first storage location, with said first compare result on at least a per location basis to provide a second compare result which is indicative of whether or not said indicia on said sectors of said particular medium correspond with said indicia on said sectors of an original medium; and means responsive to the second compare result for executing said product program only in response to the comparison determining that predetermined locations on the medium and the key pattern indicate a predetermined location comparison, thereby indicating that said particular medium is an original.

40. The combination claimed in claim 39, wherein said particular medium is a disk.

41. The combination claimed in claim 40, wherein said disk is a floppy disk.

42. The combination claimed in claim 40, wherein said disk is a hard disk.

43. A software copy-protection apparatus, which is operable with a computer, comprising:

a particular magnetic medium having records formed thereon which are divided into tracks, with each track being comprised of a plurality of bit storage locations, with an original medium having indicia on at least one bit storage location of at least one track of at least one record that are not modifiable by the medium write process, with a copied medium not having said indicia, or having indicia in a different pattern than said indicia;

a product program which is to be executed only if said medium is an original;

means for storing a key pattern in a first storage location, which is a binary representation indicative of the presence or absence of said indicia at predetermined locations of said at least one track of an original medium;

means for writing at least portions of said records of said medium with a test pattern which generates a change in the pattern of magnetic domains in said medium at predetermined bit locations within said portions, said portions including at least said indicia-containing bit storage locations, with a bit location in said portions responding to said test pattern only in the absence of indicia thereon;

means for storing said test pattern in a second storage location;

means for reading out said portions and storing the read out data in a third storage location;

means for comparing the test pattern stored in said second storage location with the data stored in said third storage location on at least a per bit corresponding storage location basis to provide a first compare result;

means for comparing said key pattern, stored in said first storage location, with said first compare result on at least a per location basis to provide a second compare result which is indicative of whether or not said indicia on said tracks of said particular medium correspond with said indicia on said tracks of an original medium; and means responsive to the second compare result for executing said product program only in response to the comparison determining that predetermined locations on the medium and the key pattern indicate a predetermined location comparison, thereby indicating that said particular medium is an original.

44. The combination claimed in claim 43, wherein said particular medium is a magnetic tape.

45. A method of forming a hardware key on a magnetic medium to indicate that said magnetic medium is an original and not a copy, said method comprising the step of:

introducing indicia into predetermined areas of said magnetic medium to create said key, with data read from said areas differing from data written to said areas, due to the presence of said indicia, as said indicia do not respond to a magnetic field by changing the pattern of magnetic domains therein.

46. The combination claimed in claim 45, wherein said magnetic medium is a disk, having tracks formed thereon which are divided into sectors, with each sector being comprised of a plurality of bit storage locations, with said predetermined areas comprising at least one bit location of at least one sector of at least one track.

47. The combination claimed in claim 46, wherein the said disk is a floppy disk.

48. The combination claimed in claim 46, wherein the said disk is a hard disk.

49. The combination claimed in claim 45, wherein said indicia are comprised of one or more regions containing no magnetic material, such regions being therefore unaffected by the medium write process.

50. The combination claimed in claim 49, wherein said magnetic medium is a disk, having tracks formed thereon which are divided into sectors, with each sector being comprised of a plurality of bit storage locations, with said predetermined areas comprising at least one bit location of at least one sector of at least one track.

51. The combination claimed in claim 50, wherein the said disk is a floppy disk.

52. The combination claimed in claim 50, wherein the said disk is a hard disk.

53. The combination claimed in claim 49, wherein said magnetic medium is a magnetic tape, having records formed thereon which are divided into tracks, with each track being comprised of a plurality of bit storage locations, with said predetermined areas comprising at least one bit location of at least one track of at least one record.

54. The combination claimed in claim 45, wherein said indicia are comprised of one or more permanently magnetized regions, such regions having the property that the material therein has a coercivity higher than the magnetic field used in the medium write process, such regions being therefore unaffected by the medium write process.

55. The combination claimed in claim 54, wherein said magnetic medium is a magnetic tape, having records formed thereon which are divided into tracks, with each track being comprised of a plurality of bit storage locations, with said predetermined areas comprising at least one bit location of at least one track of at least one record.

56. The combination claimed in claim 54, wherein said magnetic medium is a disk, having tracks formed thereon which are divided into sectors, with each sector being comprised of a plurality of bit storage locations, with said predetermined areas comprising at least one bit location of at least one sector of at least one track.

57. the combination claimed in claim 56, wherein said disk is a hard disk.

58. The combination claimed in claim 56, wherein said disk is a floppy disk.

59. The combination claimed in claim 45, wherein said magnetic medium is a magnetic tape, having records formed thereon which are divided into tracks, with each track being comprised of a plurality of bit storage locations, with said predetermined areas comprising at least one bit location of at least one track of at least one record.

* * * * *